March 30, 1926.
R. G. SPESCHA
ANTISKID DEVICE
Filed August 18, 1924
1,578,478
2 Sheets-Sheet 1
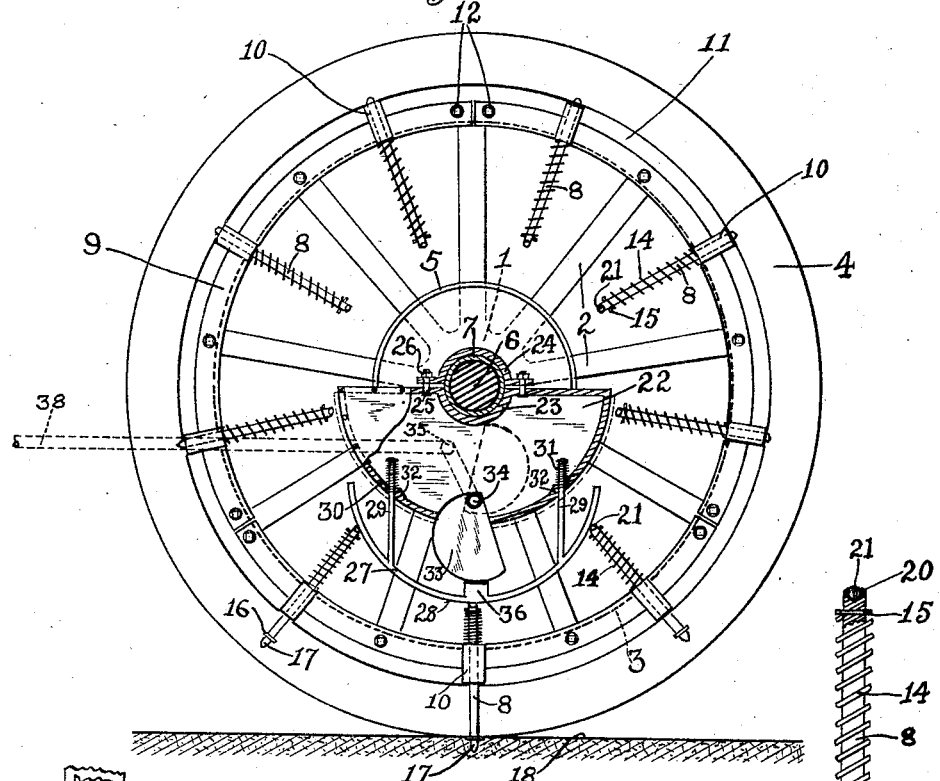
Fig. 1.
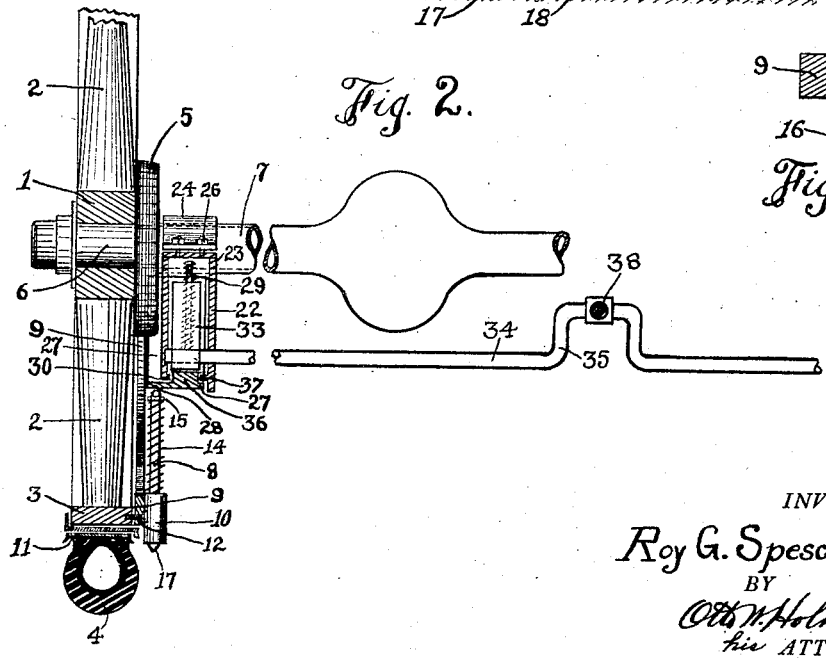
Fig. 2.
Fig. 3.
INVENTOR:
Roy G. Spescha,
BY
Otto N. Holmgren,
his ATTORNEY.

March 30, 1926.

R. G. SPESCHA

ANTISKID DEVICE

Filed August 18, 1924

INVENTOR:
Roy G. Spescha,
BY
Otis W. Holmgren,
his ATTORNEY.

Patented Mar. 30, 1926.

1,578,478

UNITED STATES PATENT OFFICE.

ROY G. SPESCHA, OF NEW YORK, N. Y.

ANTISKID DEVICE.

Application filed August 18, 1924. Serial No. 732,831.

*To all whom it may concern:*

Be it known that I, ROY G. SPESCHA, a citizen of the United States, residing in the borough and county of Bronx, city and State of New York, have invented certain new and useful Improvements in Antiskid Devices, of which the following is a specification.

This invention relates to anti-skid devices for vehicles and more particularly to devices of this general character in which one or more spurs or plungers are caused to be projected beyond the periphery of the wheel for the purpose of increasing the traction and preventing side slip.

The primary object of the invention is to simplify and improve the construction of the anti-skid device and enable the same to be removably and adjustably mounted on the vehicle.

A further object is to effect operation of the device through means located in relatively close proximity to the usual controlling levers or pedals of the vehicle so that the anti-skid device may be placed in operation with facility and quickly rendered inoperative when desired without impeding the usual movements of the driver in operating the vehicle.

A still further object is to enable the anti-skid device to be operatively secured to the wheel axle in close proximity to the hub thereof regardless of the presence of the brake drum or other device immediately adjacent to the wheel hub so that the plungers may be located relatively close to the traction line of the wheel.

Another object is to provide means for progressively advancing the spurs or spokes of the anti-skid device and causing the same to automatically return to inoperative position.

With the above and other objects in view my invention consists in the features of construction and operation set forth in the following specification and illustrated in the accompanying drawings, forming a part hereof, in which:

Figure 1 is a side elevation of a vehicle wheel showing the anti-skid device in operative position;

Figure 2 is a vertical central section through the vehicle wheel shown in Figure 1;

Figure 3 is an enlarged detail view illustrating a preferred construction of the spurs or plungers;

Figure 4:
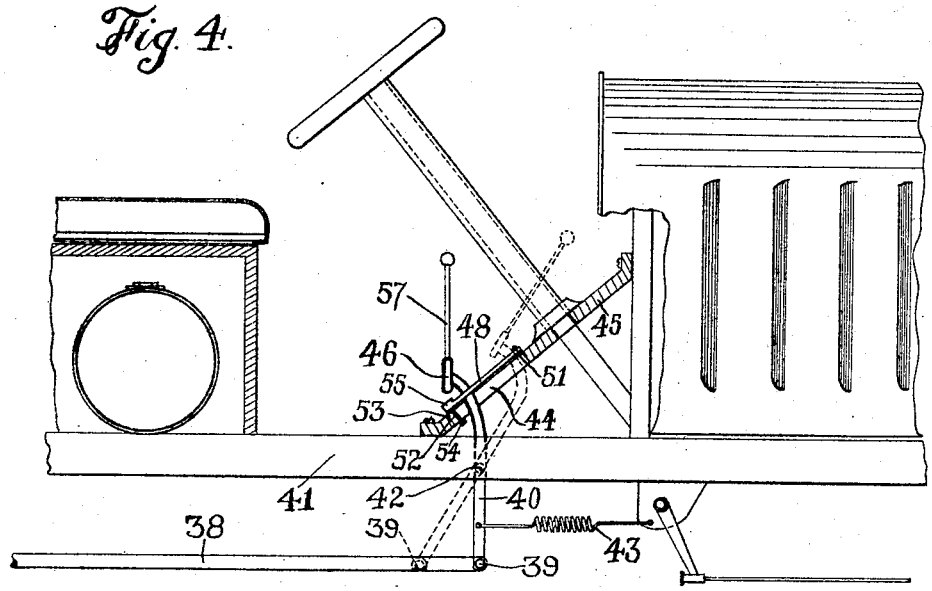
Figure 4 is a side view of a motor vehicle showing the connection of the operating rod of the anti-skid device with its operating pedal at the foot-board of the vehicle.

In the drawings I have illustrated a motor vehicle wheel which may be of the conventional type, comprising a hub 1, a plurality of spokes 2, rim 3 and tire 4. In this instance the vehicle wheel is also equipped with a brake drum 5 secured in place immediately contiguous to the hub of the wheel in accordance with usual practice. The wheel as shown is a rear wheel, mounted on an axle 6 provided with the usual housing 7.

The anti-skid device proper includes preferably a plurality of longitudinal spring held plungers 8 suitably secured to the vehicle wheel and adapted to be projected and retracted as the wheel passes over the traction surface.

In this instance I provide a metallic ring 9 which may be formed in one piece or in a plurality of sections as may be desired. A plurality of plunger cylinders 10 are preferably formed integral with the ring 9, each being so located with respect to the ring that a substantial portion thereof is adapted to project beyond the periphery of the ring 10 substantially to the periphery of the tire securing rim 11. The ring 9 is adapted to be secured to the wheel rim 3 by any suitable means, as by the bolts 12 employed in this instance.

The plungers 8 are adapted to reciprocate in a bore 13 formed in the cylinders, this bore 13 affording a substantial bearing and support for the plungers in the performance of their particular function. The plungers are normally held in retracted position by resilient means, such as the springs 14 which surround the plungers above the cylinders. These springs are adapted to be compressed between the tops of the cylinders 10 and a suitable stop pin 15 located at the upper portions of the plungers. The retractive movement of the plungers under the influence of the springs is preferably limited by suitable means, in this instance by a stop ring 16 secured to each of the plungers adjacent to its outer end. This stop ring also performs another function of limiting the penetration of the plunger point 17 into the traction surface 18. The stop ring 16 is adapted to be received in an enlarged portion 19 of the bore 13 at the outer end of the plunger cylinder 10. The upper portion of each of the plungers is preferably peened as seen at 20 forming a recess or bearing for a ball 21.

Means are provided for effecting projection of the plungers 8 beyond the periphery of the vehicle wheel and into the traction surface 18. In this instance I have provided a substantially semi-circular hollow casing 22 having a recessed portion 23 adapted to embrace one side of the axle housing 7 and a separate removable cover 24 adapted to embrace the opposite side. The casing 22 and cover 24 are rigidly mounted about the axle housing by any suitable means, in this instance a plurality of bolts 25 being rigidly secured in the upper portion of casing 22 and adapted to pass through side lugs projecting from the cover 24. Nuts 26 are provided for tightly securing the cover and casing together about the axle housing.

A substantially semi-circular cam shoe 27 is suitably located within the casing 22. This cam shoe 27 has a substantial bearing surface 28 and is adapted to be moved outward beyond the outer limit of the bottom of the casing 22 to positions which will cause the ends of the plungers to ride over the bearing surface 28 as they approach the traction surface and be thus projected as seen in Fig. 1. The diameter of the casing is preferably such that a substantial clearance is left between the bearing surface 28 of the cam shoe and the upper ends of the plungers when the plungers are in their retracted position.

The cam shoe 27 is supported and guided within the casing 22 by means of a plurality of guide pins 29 which pass through the bottom wall 30 of the casing and suitable springs 31 are provided between the upper ends of the guide pins 29 and the bearing lugs 32 formed at the inner wall of the casing bottom portion 30 for normally maintaining the cam shoe within the outer limits of the casing as will be understood.

An eccentric cam 33 having a substantially semi-circular bearing surface is pivotally mounted within the casing 22 and this cam 33 is capable of oscillatory movement for alternately forcing the cam shoe 27 outward and permitting it to return to inoperative position. In this instance the cam 33 is secured to one end of a cam shaft 34 which extends preferably through the side of the casing 22. The opposite end of the cam shaft preferably similarly extends into the casing 22 of the anti-skid device secured adjacent to the vehicle wheel at the other end of the axle 6 (not shown). Suitable means are preferably provided for effecting rotation of the cam shaft, in this instance a crank 35 being formed on the shaft at any desired point in its length, preferably at a point substantially in alignment with the operating pedal hereinafter described, generally located at one side of the vehicle. The cam shoe 27 is provided with a bearing lug 36 adapted to extend through an aperture 37 in the bottom casing portion 30 and within the casing 22 in close proximity to the bearing surface of the cam 33.

An operating rod 38 is suitably secured to the crank 35. Movement of this rod in one direction will cause the cam 33 to rotate, forcing the cam shoe 27 outward to the position shown in full lines in Fig. 1 and effecting projection of the plungers. Movement of the rod 38 in the opposite direction will cause the cam 33 to return to its normal inoperative position within the casing as seen in dotted lines in Fig. 1 and the springs 31 will draw the cam shoe 27 back to its normal inoperative location.

The wide bearing surface 28 causes the plungers to positively advance and retract in a gradual manner so that noise and destructive jar and wear are prevented. The travel of the plunger ends over the outer surface of the cam shoe 27 is further facilitated by the provision of the bearing balls 21.

As seen in Fig. 2, the bearing portion 28 of the cam shoe 27 extends outward beyond the outer side of the casing 22. The purpose of this is to impart a feature of adjustability to the anti-skid device whereby it may be mounted for operation with vehicle wheels having a brake drum or other device at the inner side of the wheel hub. The presence of such brake drum or other device has heretofore necessitated the location of the plungers a substantial distance from the traction line of the wheel but with my device the plungers are positioned relatively close to the line of traction where they are most effective.

As seen at 39, the operating rod 38 is pivotally connected to a pedal lever 40 pivoted to the frame 41 of the vehicle at 42. Suitable means, here shown as a spring 43 connected to any rigid portion of the frame 41, normally tends to maintain the lever 40 and hence the operating rod 38 and cam 33 in inoperative position.

Figure 5:
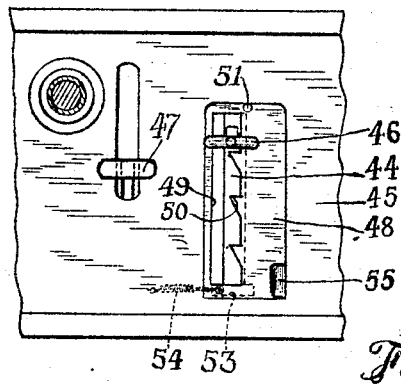
Figure 5 is a partial top plan view of the foot-board showing the automatic floor plate used in conjunction with the operating pedal of the anti-skid device, the pedal being in operative position.
Figure 6:
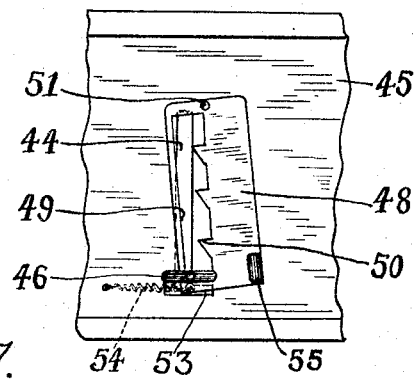
Figure 6 is a view similar to Figure 5, showing the floor plate in the position assumed when the pedal is caused to return to inoperative position.

The pedal lever 40 projects through a slot 44 located in the foot board 45 and is provided with a suitable foot plate 46. The pedal lever 40 and slot 44 are preferably located in relatively close proximity to the brake pedal here indicated at 47. Means are provided for holding the pedal lever 40 in various adjusted positions to effect different degrees of projection of the plungers. In this instance I provide a movable floor plate 48 having a slot 49 of greater width than the slot 44 traversed by the pedal lever 40, and a service of stops or teeth 50, one for each desired position of adjustment. The floor plate 48 is pivoted as seen at 51 and is adapted to turn on its pivot so that the stops 50 are withdrawn from the slot 44. A suitable pin 52 located at the under side of the floor plate 48 is adapted to traverse an extension 53 of the slot 44 and a suitable spring 54 secured to this pin 52 and to the frame 41 at the under side of the foot board 45 tends to maintain the floor plate in its normal position as seen in Fig. 5 and to return it after displacement from its usual position in alignment with slot 44. Movement of the floor plate is accomplished by means of a kick-lug or ear 55 uprising therefrom at one side.

In operation, the foot plate 46 of the pedal lever 40 is pressed by the foot of the operator until it reaches the desired position when it will be held in place by one of the stops 50. This movement will effect operation of the plunger operating cam shoe as already described. When it is desired to render the anti-skid device inoperative the operator simply strikes or presses on the lug or ear 55 with his foot. This will turn the floor plate on its pivot and withdraw the stop 50 from behind the pedal lever. The pedal lever will then return to the base of the slot 44 under the influence of spring 43 and the spring 54 will in turn cause the floor plate to return to its normal position.

Figure 7:
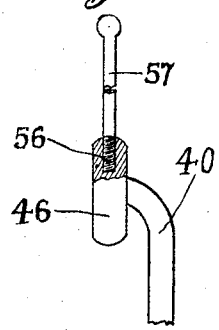
Figure 7 is a fragmentary side view of the operating foot pedal, partly in section, illustrating the adaptation of a hand lever thereto.

The provision of the pedal lever operating mechanism herein described enables the driver to control the operation of the anti-skid device with great facility and the location of the pedal lever in convenient juxtaposition to the brake pedal 47 renders the anti-skid pedal readily and easily accessible, but one movement of the foot being required to operate the device to either "on" or "off" positions.

Where hand operation is desired I provide the pedal lever foot plate 46 with a screw threaded recess 56 seen in Fig. 7 and a removable handle 57.

The ring 9 carrying the plungers 8 may be constructed in one piece for new installations or may be constructed in a plurality of sections as shown herein for attachment to the wheels without the necessity of removing the wheels from the axles. The invention is equally applicable to vehicle wheels of the solid or disk type, in which case the plunger carrying ring 9 is secured to the outer portion of the disk just within the peripheral limit. The disk portion in this instance corresponds in all essential respects to the outer rim 3 of the vehicle wheel shown herein. In certain cases it is possible to secure the cam casing 22 directly over or adjacent to the point of attachment of the vehicle springs to the axle housing, and it is to be understood that such variations and modifications of the construction are included within the spirit and scope of the invention.

The anti-skid device is always ready for instant use and is operable either by hand or by foot or by both. The device is adapted to replace non-skid devices in the form of chains or otherwise, and effectively prevents skidding or sliding on slippery surfaces such as ice, snow or mud and is also utilizable for the purpose of increasing the tractile effort of the vehicle wheels on roadways or surfaces having a loose covering of dirt, ashes, cinders and the like.

Having thus described my invention, what I claim is:

1. In combination with a vehicle wheel including a rim, an axle and a housing for said axle, a casing adapted to be removably secured to said housing between said axle and the traction surface, a reciprocatory plunger adapted to be mounted on said rim in a plane offset from the plane of said casing, a substantially semi-circular cam shoe mounted in said casing having an external bearing member and means in said casing adapted to effect projection of said cam shoe beyond the outer limit of the casing, said bearing member being adapted to extend beyond the side of said casing to a point substantially in the vertical plane of said plunger whereby the cam shoe when projected may engage said plunger and cause the plunger to penetrate the traction surface.

2. In combination with a vehicle wheel including a rim, an axle and a housing for said axle, a casing adapted to be removably secured to said housing between said axle and the traction surface, a reciprocatory plunger adapted to be mounted on said rim in a plane offset from the plane of said casing, a substantially semi-circular cam shoe mounted in said casing having an external bearing member, an eccentric cam within said casing adapted to be rotated to effect projection of said cam shoe beyond the lower limit of said casing, said bearing member having a portion adapted to extend beyond the side of said casing to a point substantially in the vertical plane of said plunger, whereby the cam shoe when projected may engage said plunger and cause the plunger to penetrate the traction surface.

3. In combination with a vehicle wheel including a rim, an axle and a housing for said axle, a casing adapted to be removably secured to said housing between said axle and the traction surface, a reciprocatory plunger adapted to be mounted on said rim in a plane offset from the plane of said casing, a substantially semi-circular cam shoe mounted in said casing having an external bearing member, an eccentric cam within said casing adapted to be rotated to effect projection of said cam shoe beyond the lower limit of said casing, spring pressed guiding means in said casing adapted to cause said cam shoe to return to normal inoperative position, said bearing member having a portion adapted to extend beyond the side of said casing to a point substantially in the vertical plane of said plunger, whereby the cam shoe when projected by said cam may engage said plunger and cause the plunger to penetrate the traction surface.

4. In combination with a vehicle wheel including a rim, an axle and a housing for said axle, a casing adapted to be removably secured to said housing between said axle and the traction surface, a reciprocatory plunger adapted to be mounted on said rim in a plane offset from the plane of said casing, a substantially semi-circular cam shoe mounted in said casing having an external bearing member, an eccentric cam within said casing, a cam shaft parallel with said axle and extending into said casing, said cam being rigidly secured to said cam shaft, means adapted to be located in proximity to the operating parts for said vehicle for producing rotation of said cam shaft and cam for projecting said cam shoe beyond the lower limit of said casing, and a plurality of spring pressed guides in said casing for causing said cam shoes to return to normal inoperative position, said bearing member having a portion adapted to extend beyond the side of said casing to a point substantially in the vertical plane of said plungers, whereby the cam shoe when projected may engage said plunger and cause the plunger to penetrate the traction surface.

5. An anti-skid device comprising the combination with a vehicle wheel including a rim, an axle and a housing for said axle, of a casing removably mounted at the under side of said housing, a plunger mounted at a side of said vehicle wheel and toward one side of said casing, a member supported in said casing and having an external bearing portion, a device in said casing arranged to displace said member beyond its normal rest position with said external bearing portion in the path of said plunger, said plunger arranged to ride over said external bearing portion during rotation of the wheel and penetrate the traction surface, means to operate said device, means to return said member to normal inoperative position, and spring means to return said plunger to normal inoperative position when disengaged from said external bearing portion.

6. An anti-skid device comprising the combination with a vehicle wheel including a rim, an axle and a housing for said axle, of a casing removably mounted at the under side of said housing, a ring including a plurality of sections secured to said vehicle wheel, a plunger mounted on each of said ring sections and toward one side of said casing, a member supported in said casing and having an external bearing portion, a device in said casing operative to displace said member beyond its normal rest position to move said external bearing portion directly into the path of said plungers, said plungers arranged to engage and ride over said external bearing portion during rotation of the vehicle wheel and penetrate the traction surface one after another, means to operate said device, means to cause said member to return to normal inoperative position, and a spring device for each of said plungers to cause said plungers to return to normal inoperative position when successively disengaged from said external bearing portion.

In testimony whereof, I have signed this specification.

ROY G. SPESCHA.